United States Patent [19]

Ionescu

[11] 4,257,516

[45] Mar. 24, 1981

[54] HIGH SPEED BOTTLE ORIENTING APPARATUS

[75] Inventor: Alexandru D. Ionescu, Bronx, N.Y.

[73] Assignee: New England Machinery, Inc., South Norwalk, Conn.

[21] Appl. No.: 971,633

[22] Filed: Dec. 20, 1978

Related U.S. Application Data

[62] Division of Ser. No. 763,906, Jan. 31, 1977.

[51] Int. Cl.³ .............................................. B65G 47/24
[52] U.S. Cl. ................................... 198/399; 198/407; 198/416
[58] Field of Search ............... 198/398, 400, 399, 401, 198/624, 620, 604, 605, 407, 408, 416; 221/173; 193/43

[56] References Cited

U.S. PATENT DOCUMENTS 3,499,520  3/1970  Willsey .............................. 198/400

FOREIGN PATENT DOCUMENTS 2524920 12/1976 Fed. Rep. of Germany ........... 198/399
1403182  8/1975 United Kingdom ..................... 198/399

*Primary Examiner*—Robert B. Reeves
*Assistant Examiner*—Douglas D. Watts
*Attorney, Agent, or Firm*—Jack Posin

[57] ABSTRACT

A bottle orienting apparatus for orienting at high speed a train of successively advancing, randomly oriented, bottles having an open end and a closed end into a train of bottles having a uniform orientation, is disclosed. The apparatus comprises a guide system for advancing the bottles in the randomly oriented train, a discriminating system for inverting each of the bottles of open-end leading disposition in the train to an open-end trailing disposition and for passing through the discriminating system without inversion each of the open-end trailing bottles in the train, and a take-off system for removing uniformly oriented bottles from the discriminating system. The discriminating system successively transversely grasps each of the randomly oriented bottles in the train, accelerates each of the bottles into the discriminating system, reorients those of the bottles therein which require reorientation, and releases its grip on the bottles when they have completed their passage through the discriminating system.

The foregoing abstract is neither intended to define the invention disclosed in the specification, nor is it intended to limit the scope of the invention in any way.

1 Claim, 18 Drawing Figures

HIGH SPEED BOTTLE ORIENTING APPARATUS

This is a division of application Ser. No. 763,906 filed Jan. 31, 1977.

BACKGROUND OF THE INVENTION

The present invention relates generally to a bottle orientation system and, more particularly, to apparatus for aligning randomly oriented bottles of open-end leading and open-end trailing dispositions in a train of such bottles so that they are selectively inverted to provide a train of bottles in which all of the bottles therein have, in common, an open-end trailing disposition.

Pharmaceutical companies, cosmetic manufacturers and other manufacturers sell millions of bottles yearly of such items as medicaments, lotions, ointments, salves, oils, etc., and employ various mechanical devices to treat and fill the bottles with the appropriate contents as rapidly and effectively as possible. The bottles, in an empty condition, are usually simply randomly batched in a holding tank or the like that is equipped with means for discharging the bottles one-by-one in random open-end leading and open-end trailing dispositions to a conveying system. The conveying system advances the bottles through various stations at which the bottles are selectively oriented into common dispositions, first into an open-end trailing disposition and then into an open-end up disposition, and then the bottles are cleaned or filled or otherwise treated preparatory to being packaged, stored and sold.

The present invention relates to apparatus for orienting bottles and includes means for discriminating between a bottle advancing in open-end leading disposition and a bottle advancing in an open-end trailing disposition, the discriminating means functioning to invert those bottles of open-end leading disposition each to an open-end trailing disposition and to pass through without inversion those bottles which arrive in an open-end trailing disposition.

A number of devices for discriminating between bottles of open-end leading disposition and bottles of open-end trailing disposition are already known in the art such as, for example, the respective devices disclosed in U.S. Pat. No. 3,339,702, issued on Sept. 5, 1967 to R. F. Novak et al., and U.S. Pat. No. 3,894,628, issued on July 15, 1975 to A. G. Pugh. The discriminating devices disclosed in these patents are capable of altering ("inverting") the disposition of those bottles which arrive in an open-end leading condition to an open-end trailing condition, and such devices are associated with means for thereafter advancing each of the bottles in open-end trailing disposition to various processing stations at which the bottles are collected and treated.

The object of utilizing mechanical means to orient the bottles in succession, clearly, is to operate upon as many of the bottles as possible in the least amount of time. Each and every stage of manipulating the bottles is a potential source of lost time and must be as efficient as possible so as not to interfere with maximized output. Clearly, when a bottle of open-end leading disposition is in the process of being inverted from an open-end leading disposition to an open-end trailing disposition, there results a delay in the rate of advancement of bottles upstream of (behind) the one being inverted, thereby restricting the number of bottles that can be inverted and further advanced in a given allotment of time.

A disadvantage associated with the devices disclosed in the aforementioned U.S. patents is that the disclosed discriminating means for inverting the bottles do not frictionally grip the bottles during the inversion (or inversion by-pass) operation, nor do they mechanically accelerate the bottles away from the feed train and into the discriminating means to enable the next bottle immediately upstream thereof to be promptly advanced for similar manipulation. As a result, the entire bottle-orienting process is not as efficient as it might otherwise be. It is just such a disadvantage that is overcome by the present invention.

SUMMARY OF THE INVENTION

Accordingly, it is an object of the present invention to provide an improved bottle orienting apparatus. Further objects of this invention are to provide bottle orienting apparatus having improved bottle discriminating means and improved bottle removal means.

The present invention includes what may be characterized as a discriminating means which successively transversely grasps each of the randomly oriented bottles in a train of such bottles, accelerates each of the bottles upon their movement into the discriminating means, selectively reorients those of the bottles therein which require reorientation, and releases its grip on the bottles when they have completed their passage through the discriminating means. The accelerated movement into and controlled movement of the bottles through the discriminating means prevents interference between the lead bottle in the upstream train and the trailing bottle in the discriminating means and permits high speed operation of the bottle sorting apparatus.

Pursuant to one embodiment of the present invention, the arrangement for gripping the bottles during their passage through the discriminating means comprises a roller having axially spaced, elastomeric, radially elongated walls which form a U-shaped or annular channel, the width of which is slightly less than the body-width of each of the bottles so that, upon entry of a bottle into the U-shaped channel of the discriminating means roller, the elastomeric walls frictionally grip the opposite walls of the bottle. The peripheral speed of the discriminating roller walls at their points of contact with the bottle is chosen to be suitably higher than the velocity of the bottles in the feed train upstream of the discriminating means so that each bottle entering the discriminating means accelerates away from the feed train. Also, take-off means which cooperate with the discriminating means is provided for removing uniformly oriented bottles from the discriminating means.

BRIEF DESCRIPTION OF THE DRAWINGS

While the specification concludes with claims which particularly point out and distinctly claim the subject matter regarded as the invention herein, it is believed that the invention will be better understood from the following description taken in conjunction with the accompanying drawings, in which:

FIG. 5 is an enlarged, fragmentary, rear elevational view of a portion of the assembly of the present invention;

FIG. 18 is an enlarged, schematic view of the bottle-dragging means of FIG. 14.

DETAILED DESCRIPTION OF THE INVENTION

Overall Machine

Figure 1:
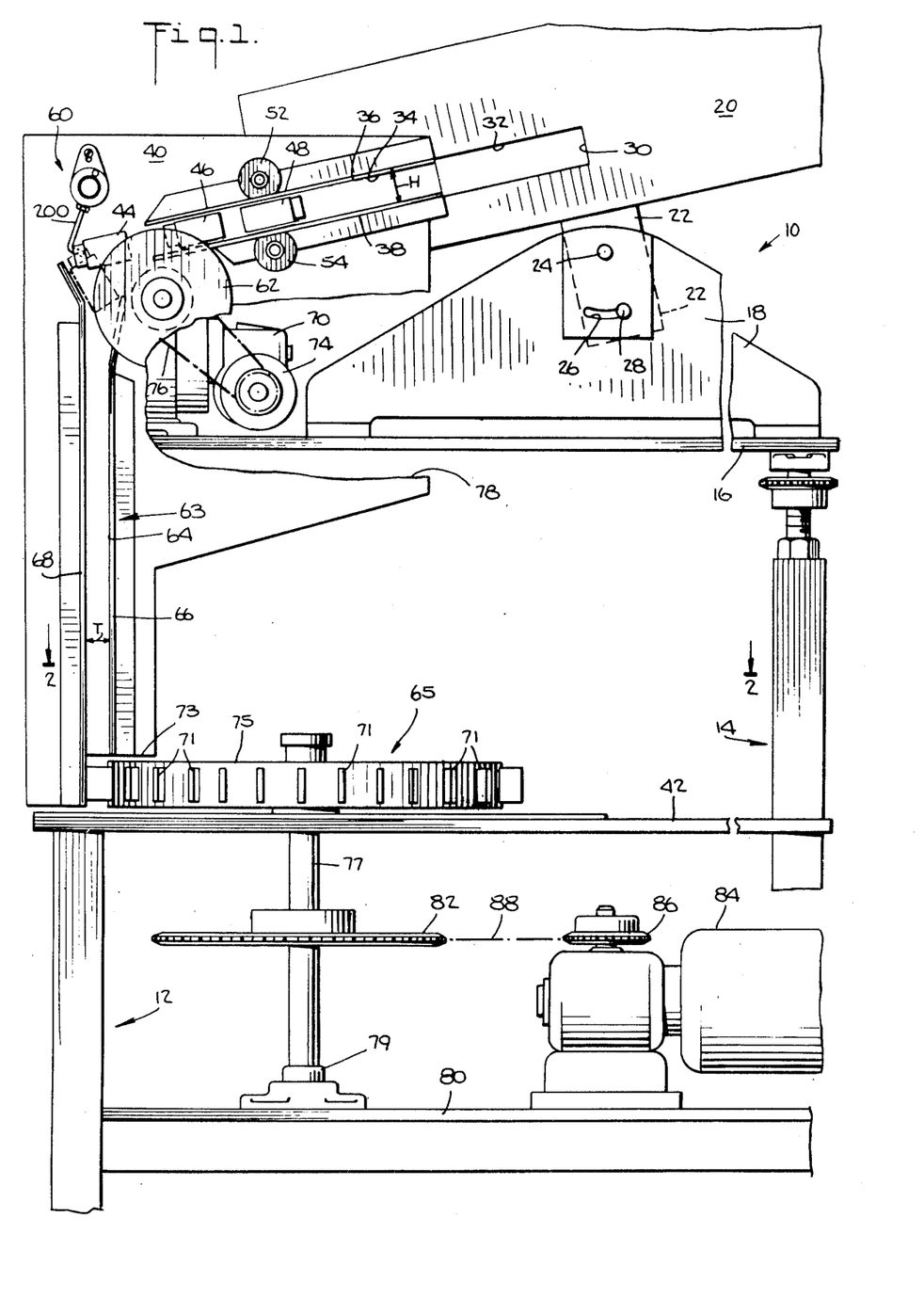
FIG. 1 is a fragmentary, front elevational view of an assembly in which is incorporated the apparatus pursuant to the present invention.

Referring now to the drawings, and more particularly to FIG. 1, there is illustrated a bottle orienting apparatus denoted generally by the reference character 10. The apparatus 10 includes a lower frame portion 12 and an upper frame portion 14 secured to and upon the frame portion 12. The upper frame portion 14 supports a platform 16 to which is secured an upstanding bracket 18. Pivotally connected to the bracket 18 is a bottle-container or supply unit 20 having a base flange 22 which can be adjustably tilted about a pin 24 or the like interconnecting the base flange 22 to the bracket 18.

The angular orientation of the base flange 22 relative to the bracket 18 may be selectively fixed by means of a clamping screw 28 or the like which extends through an arcuate slot 26 formed in the bracket 18 and is threadedly constrained in a threaded aperture (not shown) formed in the base flange 22 behind the bracket 18. Thus, the orientation of the supply unit 20 can be altered from one of a horizontal disposition (not shown) to one of a tilted disposition as illustrated in FIG. 1.

The supply unit 20 may be, for example, a conventional tank-like device for containing a large number of plastic bottles randomly predisposed therein, for example, by hand or conveyor belt delivery. The unit 20 is equipped with appropriate mechanism (not shown) for discharging the bottles in succession, one-by-one, through an outlet port 30 into a chute or conduit 32. The unit 20 may be, for example, of the type which utilizes a rotating cone or plate (not shown) to discharge the bottles in succession, under slight pressure, through the port 30. A typical version of the unit 20 is, for example, sold under the registered trademark CENTRIFEED by the firm Tangen Drives, Inc. of Clearwater, Fla.

Figure 4:
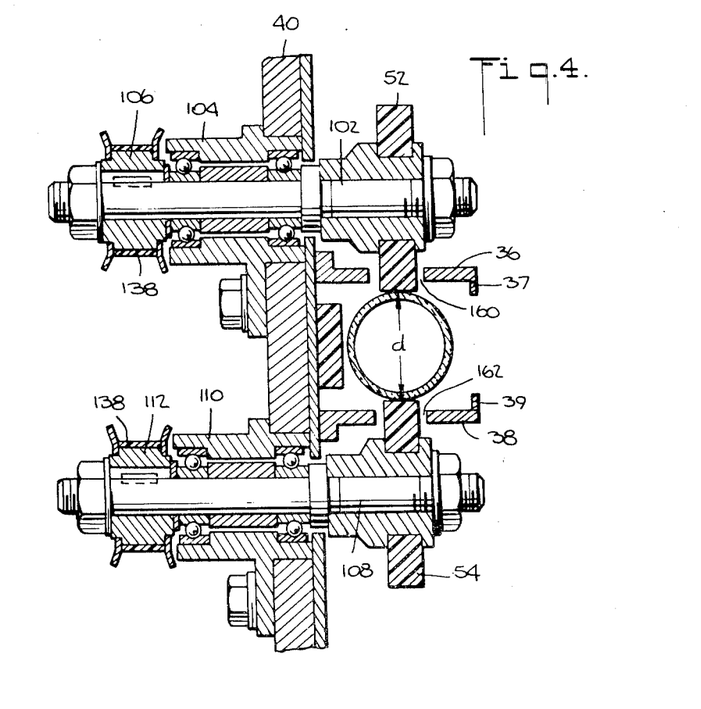
FIG. 4 is an enlarged, cross-section view, taken along the line 4—4 in FIG. 6, of a portion of the apparatus pursuant to the present invention.

Communicating with the chute 32 of the unit 20 is a chute 34 defined by an elongate upper member 36 and an elongate lower member 38. The members 36 and 38 are secured to one side face of a bracket 40 which is supported in upstanding relation upon a lower platform 42 of the frame portion 14. The conduits 32 and 34 have substantially the same dimensions and are adapted to guide the advancement of bottles discharged from the port 30 of the unit 20, such as the bottles 44, 46 and 48. The chute 32 is closed on four sides, whereas the members 36 and 38 are provided, preferably, with respective elongate lips 37, 39 preferably running their full length up to the chute 32 (FIG. 4).

The bottles may be either flexible or rigid and they may be either of shoulder-and-neck or full-width-neck construction. The bottles may have a round, oval or rectangular cross-section so long as the diameter d (FIG. 4), in the case of round bottles, or the vertical height h (FIG. 3), in the case of oval or rectangular bottles is slightly less than the height H (FIG. 1) of the conduits or chutes 32 and 34. The bottles, therefore, are capable of sliding loosely along the chutes 32 and 34 as a train of randomly oriented bottles, each bottle pushing the next as a result of the force exerted by the unit 20 against the last of the bottles issuing from the port 30.

Associated with the chute 34 is a pair of timing rollers 52, 54. The assembly of the timing rollers 52,54 and chute 34 constitutes a guide means for receiving and advancing a train of successive, randomly oriented, bottles having each an open end and a closed end. The timing rollers 52,54 function to control the rate of advancement of the bottles outwardly of the chute 34 and into contact with a discriminating roller 62 of a discriminating means, shown generally at 60.

The discriminating means 60 serves to successively transversely grasp each of the randomly oriented bottles in the train of bottles, accelerate each of the bottles upon their movement into the discriminating means, selectively reorient those bottles having an open-end leading disposition (such as the bottles 44 and 46) into an open-end trailing disposition, and deliver all of the bottles passing therethrough to a take-off means, shown generally at 63.

The take-off means 63 serves to remove uniformly oriented bottles from the discriminating means 60 and includes a vertically oriented chute 64 defined by a pair of parallel, spaced members 66 and 68 affixed to the upstanding bracket 40. The members 66 and 68 are spaced from one another by the distance T corresponding to the height H of the chute 34. The chute 64 is associated with a conveyor means denoted generally by the reference character 65 in FIG. 1 for transferring the appropriately oriented bottles to various stations (not shown) at which such bottles are treated further, filled, and stored for eventual distribution.

The timing rollers 52 and 54 and the discriminating roller 62 are each provided, preferably, with elastomeric bottle-contacting surfaces and are each rotatably journaled (in a manner as will be described below) in the upstanding bracket 40. The latter said rollers are also all commonly driven by a single drive means 70 in the form of a conventional motor supported on and affixed to the platform 16. The aforementioned rollers 52, 54 and 62 are all coupled to a pulley assembly 69 (FIGS. 3 and 5) including a toothed drive pulley 72 which in turn is driven by a toothed output pulley 74 of the motor 70. The pulleys 72 and 74 are coupled with one another by means of, for example, an endless toothed, positive drive belt 76. It will be understood that the upstanding bracket 40 (in FIG. 1) is cut away along the irregular, generally U-shaped, line 78 for illustrative purposes in order to schematically expose the drive means 70 for viewing.

As each of the bottles is manipulated into an open-end-trailing disposition by the discriminating means 60, each is permitted to fall one-by-one downwardly into and along the chute 64. The chute 64 guides each of the bottles into respective bottle-constraining spaces isolated from one another by means of equidistantly spaced spoke-like elements 71 (FIG. 2) extending radially outwardly from the periphery of a wheel 75 journaled upon the platform 42 (FIG. 1) adjacent to the chute 64. As illustrated in FIG. 1, the left member 68 of the chute 64 terminates in close proximity to the platform 42, whereas the right member 66 of the chute 64 terminates short of the platform 42 by a distance corresponding to the axial thickness of the wheel 75. As a result, the periphery of the wheel 75 can extend partially into the chute 64 beneath the lower end 73 of the right member 66 so that the spoke-like elements 71 project into the chute 64 as shown.

As further illustrated in FIG. 1, the wheel 75 is mounted upon a shaft 77 which is freely journaled at its lower end in an appropriate bearing support 79. The bearing support 79 is attached to and rests upon a lower platform 80 of the lower frame portion 2. Affixed to the shaft 77, is a toothed pulley 82 which when rotated is adapted to transmit rotation to the shaft, the latter which in turn transmits rotation to the wheel 75. The pulley 82 is driven by a drive means 84 in the form of, for example, a motor having a toothed output drive pulley 86 coupled with the pulley 82 through the intermediary of an endless chain or band 88.

The drive means 84 is adapted to effect continuous rotation of the output pulley 86. Thus, the pulley 82 and wheel 75 are continuously rotated in unison at a prescribed rate such that the spaces between adjacent ones of the spoke-like elements 71 are moved in succession across the chute 64 for receiving the bottles descending from the chute 64. The wheel 75, thus, withdraws the descending bottles from the chute 64, and moves the bottles horizontally along an arcuate path to a conveyor belt 92 illustrated in phantom in FIG. 2. The belt 92 moves in the direction of arrow A linearly substantially at the same rate at which the spoke-like elements 71 are rotated by the wheel 75, and is thus capable of extracting the bottles from between the spoke-like elements 71.

Figure 2:
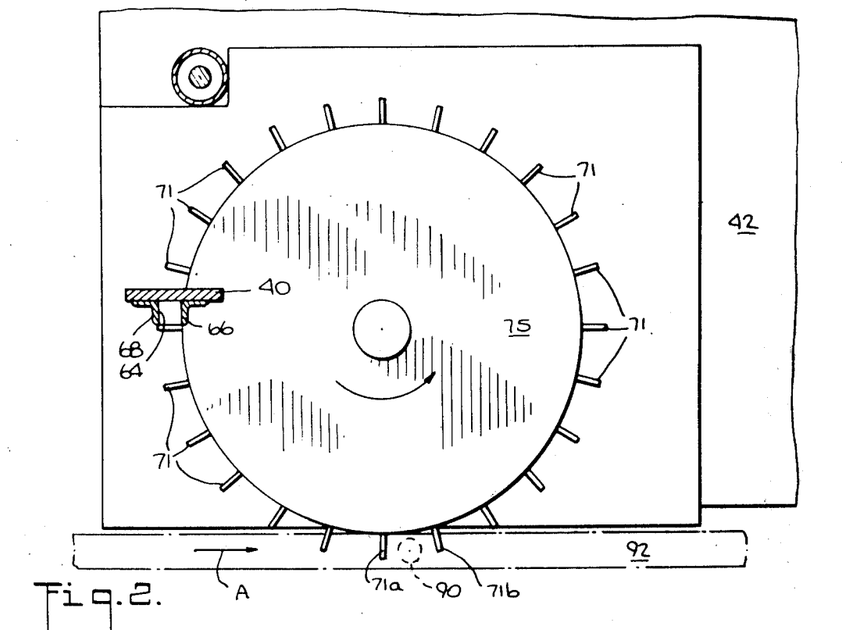
FIG. 2 is a fragmentary, plan view, taken in the direction of the line 2—2 in FIG. 1, of a portion of the assembly illustrated in FIG. 1.

In this respect, as illustrated in FIG. 2, a bottle 90 illustrated in phantom is disposed between the spoke-like elements 71a and 71b. When the bottle 90 reaches the position illustrated in FIG. 2, in the course of counterclockwise rotation of the wheel 75, the bottle 90 moves onto the conveyor belt 92. Once the bottle 90 rests upon the moving belt 92, continued movement of the belt 92 with the spoke-like elements 71a and 71b effects withdrawal of the bottle 90 for advancement to a processing station (not shown) where it can be filled or otherwise treated.

The Bottle Orienting Drive and Feed System

Figure 3:
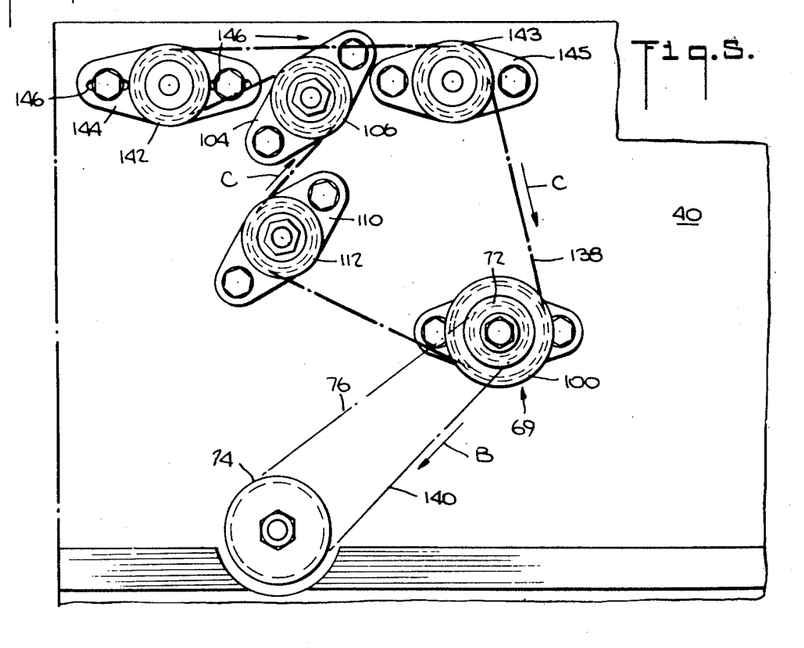
FIG. 3 is an enlarged, cross-sectional view, taken along the line 3—3 in FIG. 6, of a portion of the apparatus pursuant to the present invention.

Referring now to FIG. 3, there is illustrated the details of construction of the pulley assembly 69 for rotating the discriminating roller 62 and the timing rollers 52 and 54. As shown, the drive pulley 72 of the pulley assembly 69 is affixed to a shaft 94 which in turn is journaled in a bearing assembly 96 supported by the frame portion 40. As a result, the drive pulley 72 and the shaft 94 are rotatable together relative to the frame portion 40. Affixed to and adapted to rotate with the drive pulley 72 and the shaft 94 is a second, but larger, toothed pulley 100 which, by means of respective endless toothed belts or the like (as will be discussed below), transmits rotation to the timing rollers 52 and 54. The discriminating roller 62, however, as illustrated in FIG. 3, is affixed to an extension 94a of the shaft 94 and is caused to rotate as the shaft 94 rotates.

Illustrated in FIG. 4 is the mechanical drive arrangement for the timing rollers 52 and 54. As shown, the roller 52 is affixed upon a shaft 102 which in turn is rotatably journaled in a bearing assembly 104 secured to the frame portion 40. At the opposite end of the shaft 102 is a toothed pulley 106 which is operatively associated with the pulley 100 (FIG. 3) via an endless toothed band or the like. Similarly, the roller 54 is affixed to a shaft 108 rotatably journaled in a bearing assembly 110 secured to the frame portion 40. At the opposite end of the shaft 108 is a toothed pulley 112 which, like the pulley 106, is operatively associated with the pulley 100 via an endless toothed band or the like. It will be seen, that the respective peripheries of the rollers 52 and 54 are closer to one another than is the spacing H (FIG. 1) between the members 36 and 38. The rollers 52 and 54 are, thus, capable of engaging the diametrally opposite side portions of the bottles advancing therebetween (FIG. 4).

Referring now to FIG. 5, there is illustrated the operative association of the various pulleys with one another and with a pair of endless bands or belts denoted, respectively, by the reference characters 138 and 140. This association of parts exists on the rear side face of the frame portion 40 that is opposite of the side face thereof illustrated in FIG. 1. The endless belt 138 is operatively associated with the driven pulley 100 and with the driven pulleys 106 and 112 of the timing rollers 52 and 54, respectively. The belt 138 is also operatively associated with a pair of toothed tension control pulleys 142, 143 freely journaled on respective brackets 144 and 145, the bracket 144 having a pair of slotted openings 146 to provide for adjustability of the pulley 142 relative to the frame portion 40.

The endless belt 140 is operatively associated with the driven pulley 72 that transmits rotation to the discriminating roller 62, and with the drive pulley 74 of the motor drive means 70. It is the drive pulley 74 that moves the belt 140, the latter in turn transmitting rotation to the pulleys 72 and 100 in unison to drive the discriminating roller 62 and the timing rollers 52 and 54.

Although not shown, the belt 140 is provided with teeth on the inner one of its opposite faces to provide for positive drive of the toothed pulleys 72 and 74 it engages, whereas the belt 138 is provided with teeth on both of its opposite pulley-engaging faces to provide for positive drive of the toothed pulleys 106 and 112 it engages.

As viewed in FIG. 5, the drive pulley 74 is rotated clockwise and, thus, it moves the belt 140 in the direction of arrow B. The belt 140, thereby, rotates the pulleys 72 and 100 in unison clockwise. In turn, as a result, the belt 138 is driven in the direction of arrow C. Since the belt 138 contacts the left side of the pulley 112 and the right side of the pulley 106, the pulley 112 is caused to rotate clockwise, whereas the pulley 106 is caused to rotate counter-clockwise. Accordingly, the upper pulley 106 of the timing roller 52 rotates in an opposite direction from that of the lower pulley 112 of the timing roller 54. The timing rollers, thus, rotate in opposite directions to cooperatively control the advancement of the bottles along the chute 34.

Figures 6, 7, 8:
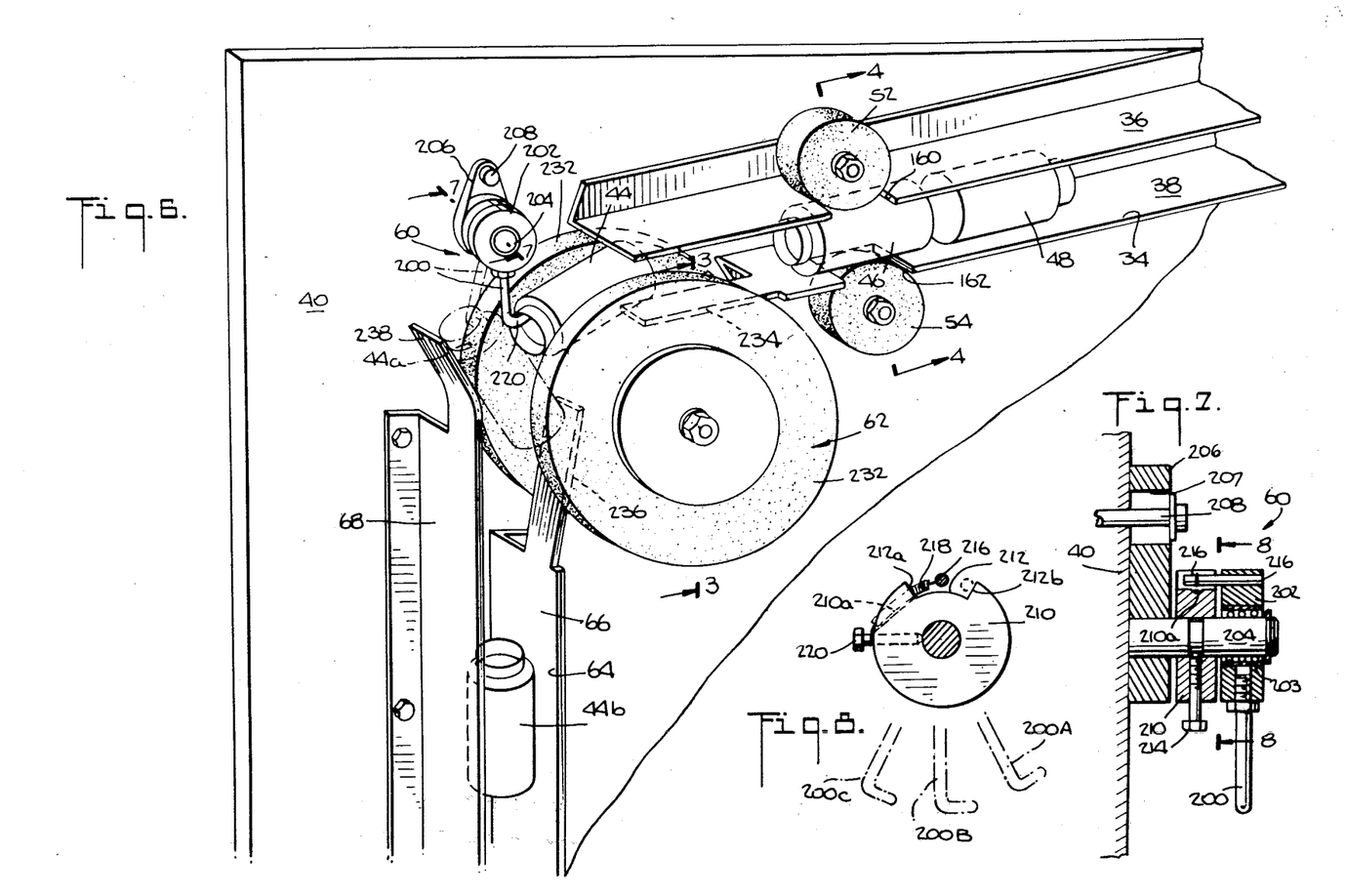
FIG. 6 is an enlarged, fragmentary, frontal perspective view of a portion of the assembly illustrated in FIG. 1.
FIG. 7 is a cross-sectional view taken along the line 7—7 in FIG. 6.
FIG. 8 is a schematic, cross-sectional view taken along the line 8—8 in FIG. 7.

Referring now to FIG. 6, there is illustrated a perspective view of the frontal face of the frame portion 40. This view best shows the association of the timing rollers 52 and 54 with the discriminating roller 62 and with the remainder of the discriminating means 60 of the present invention. The pulley-and-drive arrangement illustrated in FIG. 5 causes the roller 52 to rotate clockwise, and the roller 54 and discriminating roller 62 each to rotate counter-clockwise.

As further illustrated in FIG. 6 (and also in FIG. 4), the timing roller 52 projects slightly through a cut-out 160 formed in the upper plate member 36, whereas the lower timing roller 54 projects slightly through a cut-out 162 formed in the lower plate member 38. As a result, the respective peripheries of the rollers 52 and 54 are frictionally engageable with bottles advancing under pressure offered by the supply unit 20 downwardly along the chute 34. Since the bottles have a thickness corresponding to (but slightly less than) the width of the chute 34, the rollers 52 and 54 are adapted to slightly pinch the bottles advancing therebetween.

Bottle Discriminating Assembly

As still further illustrated in FIG. 6 (and in FIGS. 7 and 8), the remainder of the discriminating means 60 includes an inverting means or lever 200 constructed and arranged to selectively engage the downstream end portion of each open-end leading bottle in the discriminating means for selectively inverting each such open-end leading bottle to an open-end trailing disposition. The lever 200, which may also be considered a bottle-catching means, is affixed to a block 202 that is pivotally arranged via a ball-bearing assembly 203 on an axle-stub 204. The stub 204 is affixed to a bracket 206 which in turn is affixed to the frame portion 40 via a bolt 208 or the like that is arranged in a vertical slot 207 of the bracket 206. Between the block 202 and the bracket 206, there is interpositioned a second block 210 that functions to limit the angular swing of the block 202 and, thereby, of the lever 200. The block 210 is provided with a cut-out 212 that extends along the periphery thereof, for example, over approximately forty-five degrees. The block 210 can be angularly positioned and fixed on the stub 204 via a clamping bolt 214 to fix the relative position of the cut-out 212.

The block 202 is provided with a cantilevered rod 216 that projects into the cut-out 212 (FIGS. 7 and 8) of the block 210. The rod 216 is engageable with the end walls 212a and 212b of such cut-out 212 to define and limit the maximum angular swing of the block 202. The block 210 is provided with a coil spring 218 (FIG. 8) that at one end is connected to a pin 220 affixed to the block 210 (or alternatively to the bolt 214) and at its other end is connected to the rod 216. The spring 218 has an at-rest, unexpanded, condition in a bifurcated portion 210a of the block 210 such that the rod 216 is constrained against the left wall 212a of the cut-out 212, and the lever 200 is constrained in the position 200A shown in phantom in FIG. 8. However, the spring 218 can be expanded when the lever 200 is forced angularly in a clockwise direction to the respective illustrated positions 200B and 200C thereof. The rod 216 in turn moves correspondingly first to a position midway in the cut-out 212 and then into engagement with the right wall 212b, the spring 218 in the meantime continually exerting a force against the rod 216 to urge and return the lever 200 to the at-rest position 200A thereof.

Figure 9:
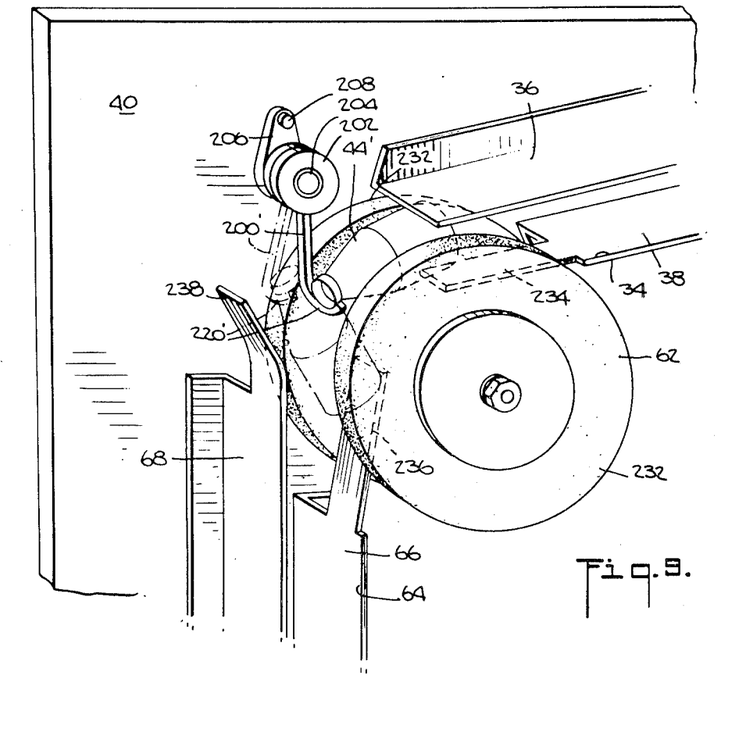
FIG. 9 is a view similar to FIG. 6 of an alternate embodiment of a portion of the discriminating means of the present invention.

The lever 200 has an L-shaped configuration as illustrated in FIGS. 6 and 8, or, alternatively, a J-shaped configuration as illustrated in an alternate embodiment thereof in FIG. 9 and denoted by the reference character 200'. The L-shaped lever 200 is used, for example, in conjunction with bottles advancing along the chute 34 having a wide mouth corresponding in size to the size of the body thereof. On the other hand, the J-shaped lever 200' is used, for example, in conjunction with bottles advancing along the chute 34 having a narrow mouth stemming from a tapered neck 44' of reduced diameter. As shown in FIG. 6, the L-shaped lever 200 terminates in a bent arm 220 projecting in a direction generally longitudinally of the chute 34, whereas, as shown in FIG. 9, the J-shaped lever 200' terminates in a hook-like, bent arm 220' projecting in a direction generally laterally of the chute 34.

Referring once again to FIG. 3, this time in conjunction with FIGS. 6 and 9, the discriminating roller 62 includes a hub 230 affixed to the drive shaft portion 94a, and a pair of flexible, bottle gripping discs 232 that are also, by convential means, affixed to the shaft portion 94a and separated from one another through the intermediary of the hub 230. The hub 230, thus, provides for an annular space between the discs 232 into which freely projects a tongue 234 of the member 38 of the chute 34 (FIGS. 6 and 9) and a tongue 236 of the member 66 of the chute 64. Such tongues 234 and 236 are spaced from the hub 230 and the discs 232 so as not to frictionally interfere with the rotation of the roller 62. It will also be seen in FIGS. 6 and 9, that the member 68 of the chute 64 includes a bent flange 238 that is inclined away from the axis of rotation of the roller 62, whereas the tongue 236 of the member 66 is bent towards the axis of rotation of the roller 62.

Figure 10:
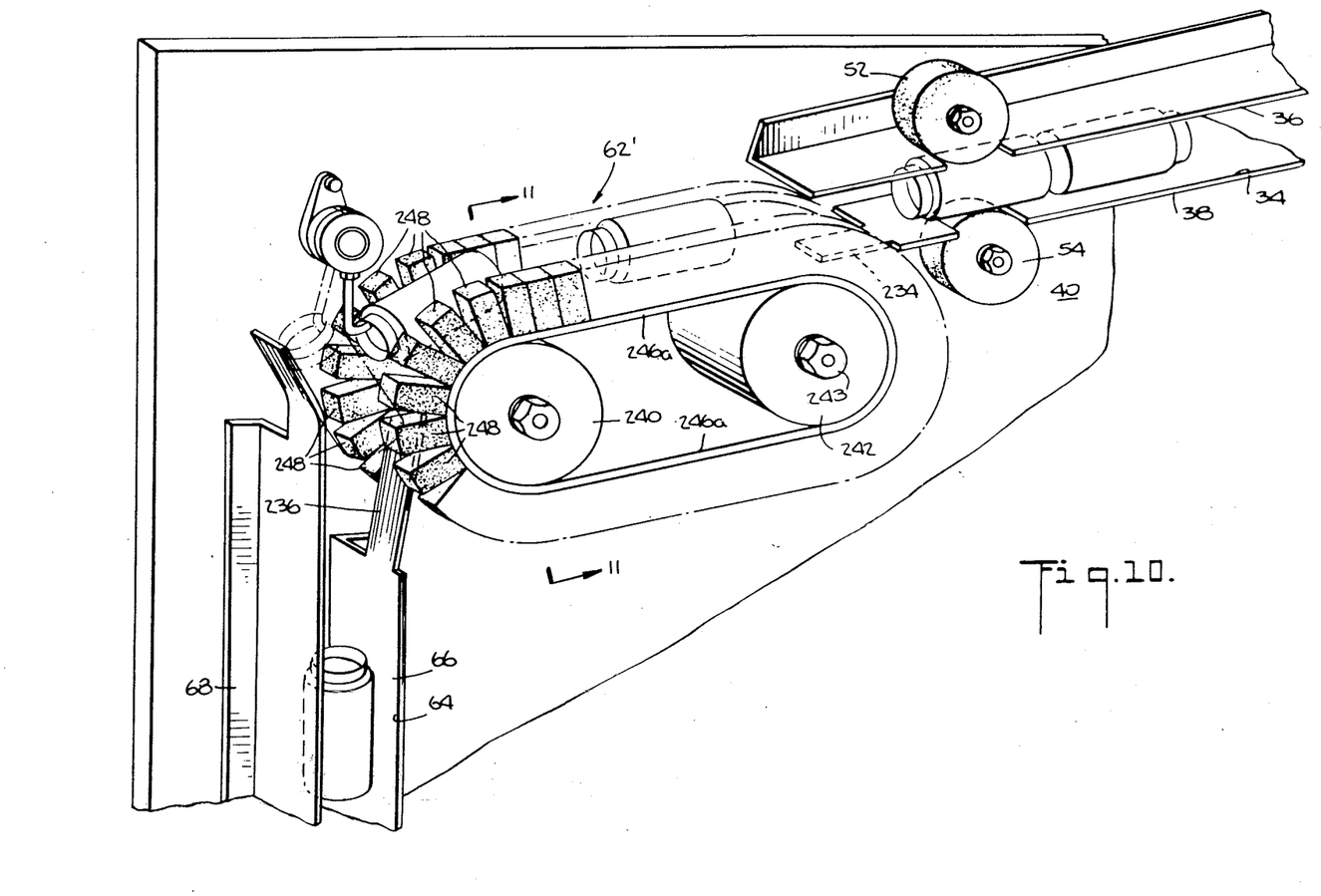
FIG. 10 is an enlarged, fragmentary, frontal, perspective view of an alternate embodiment of a different portion of the discriminating means of the present invention.
Figure 11:
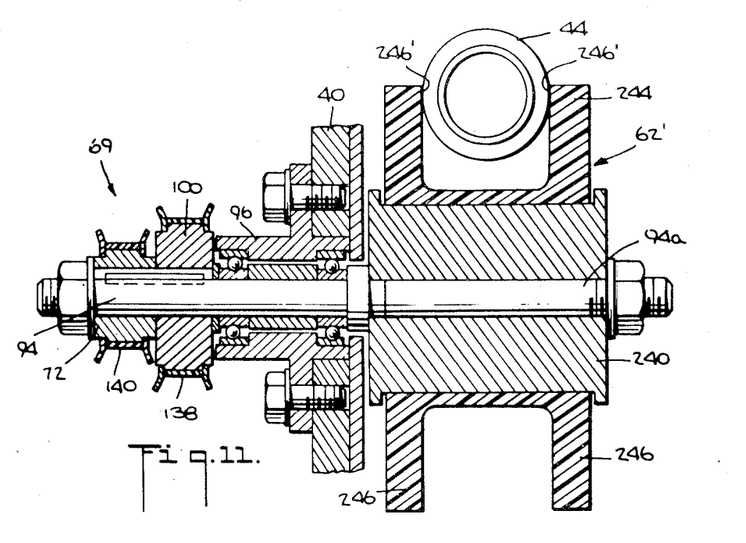
FIG. 11 is a cross-sectional view taken along the line 11—11 in FIG. 10.

Referring now to FIGS. 10 and 11, there is illustrated an alternate embodiment 62' of the discriminating roller 62. The embodiment 62' includes a hub 240 affixed to the drive shaft portion 94a in a manner akin to that of the hub 230 of the roller 62. In this instance, however, the hub 240 is associated with a second hub 242 (FIG. 10) that is freely journaled on an axle-stub 243 affixed to the frame portion 40 to idle or rotate freely in response to the rotation of the hub 240. The hubs 240 and 242 are coupled to one another through the intermediary of a flexible, endless, belt-like, conveyor 244 that is fit snugly over the hub 240 and 242 and causes the hub 242 to rotate in response to the rotation of hub 240.

The conveyor 244 is provided with a pair of flanged walls 246 (FIG. 11) that define cooperatively an annular bottle-receiving space therebetween. The walls 246 each includes a plurality of finger-like, bottle-gripping, segments 248 (FIG. 10), adjoining ones of which, on the same run, from the base of the conveyor 244, separably flare away from one another as they move onto the hubs 240 and 242 beyond the generally horizontally-oriented runs 246a thereof.

In the alternate embodiment 62', as in the first described embodiment 62, the member 38 of the chute 34 has a tongue 234 that projects into the annular space between the conveyor walls 246, and the member 66 of the chute 64 has a tongue 236 that projects also into the annular space between the walls 246. Such tongues 234 and 236 are cut of contact with the conveyor 244 so as not to frictionally interfere with the movement thereof.

Operation of the Bottle Orienting Apparatus

Initially, the supply unit 20 is filled by hand with many bottles which in succession are discharged under pressure by the supply unit 20 through the port 30 as a train of bottles into the chutes 32 and 34 in communication with one another. During this period, the drive means 70 causes the drive pulley 74 to turn, thereby transmitting rotation to the identically sized timing rollers 52 and 54, and to the larger discriminating roller 62. The timing rollers 52 and 54 act as a brake with respect to the train of bottles advancing along the chute 34 and serve to feed the bottles one-by-one in a timed sequence to the discriminating roller 62 (FIG. 6), and force in succession each leading bottle between the flexible discs 232 thereof (or between the flexible finger-like segments 248 of the conveyor 244 in FIG. 9). The trailing bottles are prevented from being dislodged from between the plate members 36 and 38 by the elongate lips 37 and 39 which, preferably, run the full length of the chute 34 up to the chute 32 (FIG. 4).

As shown in FIG. 5, the diameter of the pulley 100 is substantially twice the size of the diameter of the pulley 72 and, thus, the peripheral speed of the pulley 100 is substantially twice the peripheral speed of the pulley 72. Thus, the endless belt 138 associated with the pulley 100, and the pulleys 106 and 112 associated with the endless belt 138, are driven at the same peripheral speed as the pulley 100 which is substantially twice as fast as the belt 140 associated with the pulleys 72 and 74. However, the portions 232' of the discs 232 (FIG. 3), or the portions 246' (FIG. 11) of the conveyor 244, which grip the bottles in succession have respective diameters which are greater than twice the size of the diameters of the timing rollers 52 and 54. As a result, these effective bottle-gripping portions 232' (and 246') have rotary speeds which are greater than the rotary speeds of the timing rollers 52 and 54. Accordingly, the bottles are advanced by the discriminating roller 62 at a faster rate than they are advanced by the timing rollers 52 and 54. Thus, the bottles can be said to be "accelerated" away from the chute 34 by the discriminating roller 62, and can be said to be "braked" by the timing rollers 52 and 54.

The timing rollers 52 and 54, thus, function to slow down the rate of advancement of the bottles discharged into the chute 34 to provide sufficient time for the discriminating roller 62 and the lever 200 to invert those bottles of open-end leading disposition (such as the bottles 44 and 46 illustrated in FIG. 6) to ones of open-end trailing disposition (such as the bottle 48 illustrated in FIG. 6). Generally, those bottles having an open-end leading disposition are inverted in the manner schematically illustrated in phantom in FIG. 6 (and FIG. 9) wherein, for example, the bottle 44 is discharged by the timing rollers 52 and 54 from the chute 34 to initially engage, with its open-end, the arm 220 (FIG. 6) of the lever 200 (or the bent hook 220' in FIG. 9) adjacent to discriminating roller 62. In this disposition of the bottle 44, the portion of the bottle 44 behind the open end thereof is frictionally held by the discs 232 of the discriminating roller 62 (or the finger-like segments 248 of the conveyor 244 in FIG. 10) and is frictionally moved by the latter so that the open-end of the bottle swings upwardly by the lever 200 along the bent flange 238 to the disposition shown in phantom and denoted by the reference character 44a.

More specifically, in the instance of the embodiment of the lever 200 illustrated in FIG. 6 which includes the bent hook 220 projecting in the direction generally longitudinally of the chute 34, as the bottle 44 is frictionally gripped by the opposing, flexible discs 232 and accelerated toward the lever 200, the leading, wide, open-end or mouth of the bottle 44 is caught by the bent hook 220. Continued movement of the bottle 44 forwardly by the opposing, flexible discs 232, which continuously retain their frictional hold on the bottle 44, results in the swing of the lever 200 from the position thereof illustrated in solid line to the position thereof illustrated in broken line. Such swing extends angularly over approximately forty-five degrees as a result of the cooperation of the cantilevered rod 216 with the walls 212a and 212b of the cut-out 212 (FIG. 8).

As the lever 200 swings angularly, the bent hook 220 thereof lifts the wide, open-end of the bottle 44 upwardly and into engagement with the bent flange 238 of the chute 64. The bottom of the bottle 44 is, thereby, caused to pivot frictionally relative to the flexible discs 232 and to move downwardly into engagement with the bent flange 236. Continued rotation of roller 62 moves the bottle 44 to the position shown at 44a and finally the bottle 44 is cammed by flange 236 to the vertical disposition shown at 44b wherein it is released from both the lever 200 and the flexible discs 232 and falls into the chute 64. Once the bottle 44 is released by the lever 200 and the discs 232, the spring 218 (FIG. 8) returns the lever 200 to the position 200A thereof to await the oncoming bottle 46 and convert it, too, from a bottle having an open-end leading disposition to one of an open-end trailing disposition.

It will be understood, that when bottles having an open-end trailing disposition, such as that of the bottle 48, are accelerated by the discriminating roller 62 (or the alternate embodiment 62' in FIG. 10) into engagement with the lever 200 (or the lever 200' in FIG. 9), the respective leading closed ends thereof simply brush aside the lever 200, 200' and tilt into contact with the bent flange 236 of the chute 64, whereupon such bottles are "cammed" into a vertical disposition and fall into the chute 64.

With respect to the embodiment of the lever 200' illustrated in FIG. 9, it functions, with a slight difference, in a manner described above with regard to the lever 200 (FIG. 6). The difference is that the bent hook 220' thereof, which extends in a direction generally transversely of the chute 34, does not penetrate the tapering, leading open-ends of the bottles reaching it. On the contrary, the bent hook 220' successively catches the narrow necks 44' of such bottles from their exteriors before swinging them upwardly to reorient their open-end leading dispositions to open-end trailing dispositions. The bent hook 220' could, in an alternative embodiment, comprise a closed ring (not shown) having a diameter slightly larger than the outside diameter of the narrow neck 44' of the bottles 44.

After the bottles are accelerated into the chute 64, they are in succession removed from the chute 64 by the wheel 75 which in cooperation with, for example, the conveyor belt 92 (FIG. 2) advances the bottles to other apparatus (not shown) at which the bottles may be treated or filled, and packaged or stored.

Further Alternate Embodiment

Figure 12:
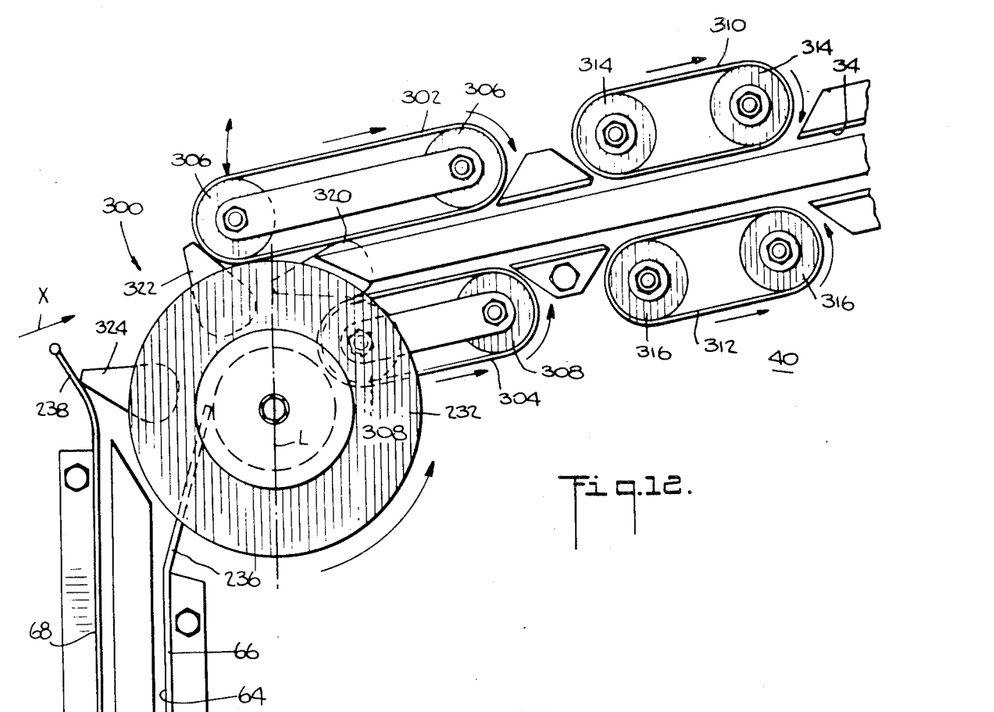
FIG. 12 is an enlarged, fragmentary, front elevational view of still another alternate embodiment of the present invention.
Figure 13:
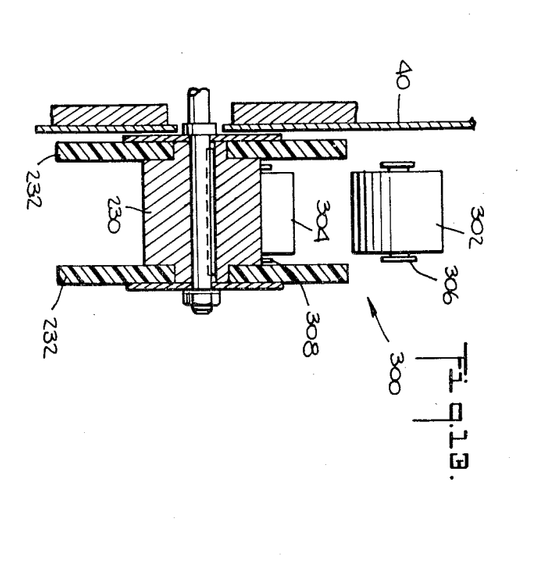
FIG. 13 is a view of the embodiment illustrated in FIG. 12 taken in the direction of arrow X.

Referring now to FIGS. 12 and 13, there is illustrated still another embodiment of the discriminating means of the present invention. In this regard, the discriminating means is denoted generally by the reference character 300. It includes the aforementioned discriminating roller 62 arranged upstream of the chute 64 defined by the plates 66 and 68, the roller 62 being comprised of the aforementioned discs 232 and the hub 230. The difference between the instant embodiment of FIGS. 12 and 13 and those of FIGS. 1–11 is that in FIGS. 1–11 there is provided a bottle-catching means or lever 200 downstream of the discriminating roller 62 for assisting the latter to invert bottles having an open-end leading disposition. The embodiments of FIGS. 1–11 are to be used preferably with bottles having wide and/or elongated open ends.

In the embodiment of FIGS. 12 and 13, no such bottle-catching means is provided upstream or downstream of the roller 62. On the contrary, a bottle-dragging means comprised of a pair of pulley-driven endless belts or bands 302 and 304 is provided to cooperate with the roller 62 and effect the necessary bottle inversion of such bottles of the narrow open-ended, bulbous, conical or pyramidal, etc., varieties.

The belts 302 and 304 may be toothed or otherwise, and are mounted each on a respective pair of pulleys 306 and 308 which correspondingly may be toothed or otherwise. At least one pulley of each pair 306 and 308 is driven by conventional means (not shown) at a prescribed rate identical to the other. The belts 302 and 304 are arranged just upstream of the roller 62, the upper belt 302 being substantially longer than the belt 304 and extending beyond and to the left of a vertical centerline L (FIG. 12) of the roller 62. The lower belt 304 supports the bottles it advances cooperatively with the upper belt 302, and turns counterclockwise. The upper belt 302, on the other hand, turns clockwise. Thus, the lower run of the belt 302 and the upper run of the belt 304 move in the same direction at substantially the same speed toward the roller 62.

Upstream of the belts 302 and 304 is a second pair of belts 310 and 312, each mounted on a respective pair of pulleys 314 and 316. At least one pulley of each pair 314 and 316 is driven by conventional means (not shown) at a prescribed rate identical to the other. The lower run of the belt 310 and the upper run of the belt 312 are driven to the left toward the roller 62 at a rate that is preferably slower than the rate at which the belts 302 and 304 are driven. In turn, the belts 302 and 304 are driven at a rate that is slower than the rate of the discriminating roller 62 at the portions of the discs 232 which grip bottles advancing thereto in succession by the belts 302,304,310 and 312. It will be understood that the runs of the belts 302,304,310 and 312 cooperatively form a moving extension to the conduit 34 of, for example, FIG. 1, and, as pairs, frictionally grip opposite sides of the bottles they advance toward the discriminating roller 62.

In operation of the instant embodiment, the belts 310 and 312 grip, in succession, bottles issuing from the conduit 34, and move such bottles to the belts 302 and 304. In turn, the faster moving belts 302 and 304 move such bottles in succession to the roller 62. The rotary speed of the roller 62, and particularly of the portions of the discs 232 thereof which grasp and remove the bottles in succession from the belts 302 and 304, is greater than the speed of the belts 302 and 304. As such, the longer, upper belt 302 exerts a "drag" on, or frictionally restrains, the upper side portion of each bottle it contacts, thereby causing each such bottle to pivot clockwise relative to the portions of the discs 232 gripping same.

If such a bottle issues from between the belts 302 and 304 in a closed-end leading disposition, the trailing open end thereof pivots clockwise into engagement with the hub 230 of the roller 62 and no further. The roller 62, thus, will in its counterclockwise rotary course carry such a bottle to the chute 64, whereupon the flange 236 will free the bottle from between the discs 232 and cause it to fall closed-end-first into the chute 64.

On the other hand, if a bottle issues from between the belts 302 and 304 with an open-end leading disposition, such as the bottle 320, the leading open end thereof will be turned clockwise into engagement, or near engagement, with the belt 302, such as at 322. This occurs as a result of the difference in speed between the relatively moving surfaces of the belt 302 and those of the discs 232, the latter moving more rapidly than the former. Thus, the open-end leading bottles, such as the bottle 320, are caused to pivot about a horizontal axis perpendicular to the discs 232. Such pivotal motion is effected until the open end of such bottles engages, or is in close proximity to, the belt 302. Continued rotation of the roller 62 moves the bottle 322 to a position 324 at which the flange 238 of the chute plate 68 is engaged by the bottle. Such engagement "cams" the bottle into an open-end-up disposition, whereupon the bottle is then cammed free from the roller 62 by the flange 236 to fall into the chute 64.

Figures 13, 14:
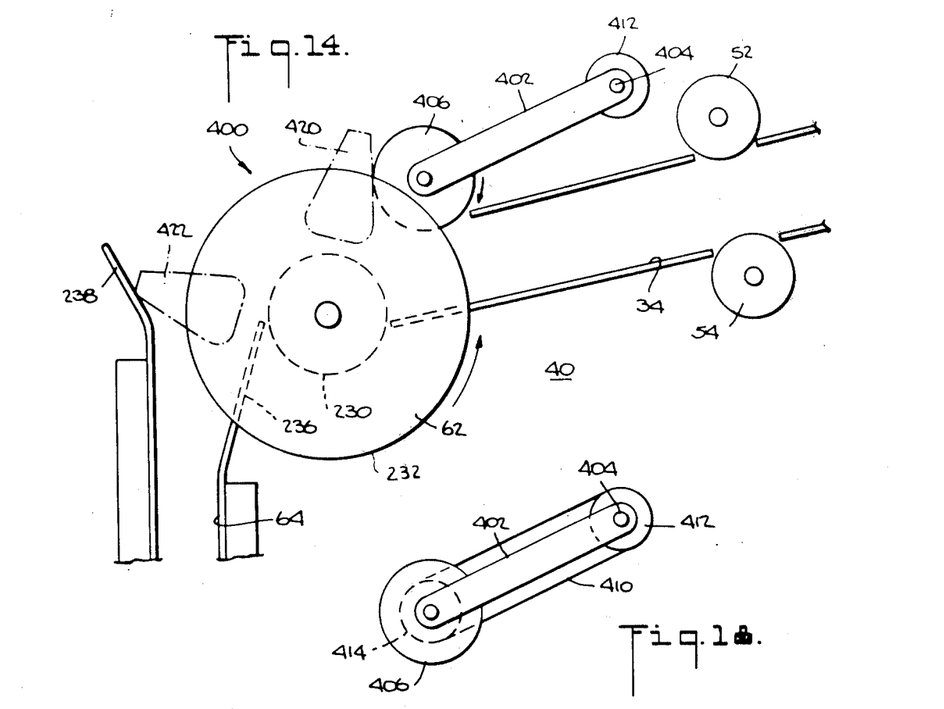
FIG. 14 is a schematic, fragmentary, frontal view of a varient of the embodiment of FIG. 13.

A variant of the embodiment of FIGS. 12 and 13 is illustrated in FIG. 14 in schematic fashion. Such a variant is denoted generally by the reference character 400 and includes the aforementioned discriminating roller 62 just upstream of the chute 64. In this instance, however, the bottle-dragging means is provided in the form of a lever 402 pivotally connected at 404 to the frame portion 40. At the opposite end of the lever 402, there is provided a roller means 406. The roller means 406 is rotatably supported by the lever 402, and includes a peripheral surface having a relatively high coefficient of friction. For example, the roller means 406 may be made of rubber or some other elastomeric material. The combined axial extent or width of the roller means 406 and the lever 402 is less than the axial extent of the hub 230 of the discriminating roller 62 (and, thus, of the axial space between the discs 232 of the roller 62). As a result, the end portion of the lever 402 supporting the roller means 406, and the roller means 406, are together insertable, and fit with substantial clearance, between the discs 232 of the discriminating roller 62.

Figure 15:
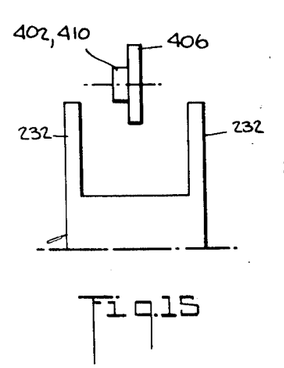
FIGS. 15 through 17 are respective, fragmentary views of partial variations of the embodiment of FIG. 14.
Figure 16:
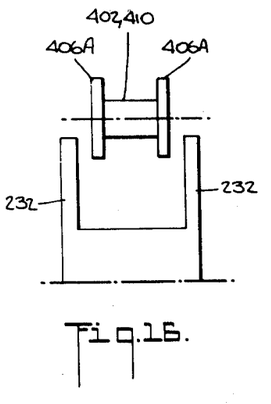
Figure 17:
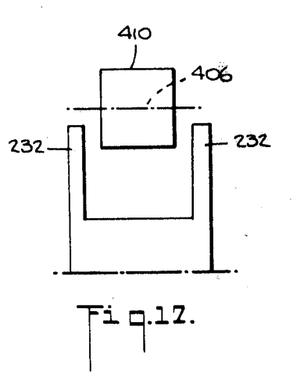

In this regard, reference is now made to FIGS. 15 through 17. In FIG. 15, the roller means 406 is shown as a single disc element. In FIG. 16, the roller means 406 is shown as a pair of identical discs 406A arranged on either side of the lever 402. In FIG. 17, the roller means 406 is covered by an elastomeric, endless, drive belt 410. In each of the instances of FIGS. 15 through 17, the elements of the roller means 406, are well spaced from the discs 232 of the discriminating roller 62 so as not to interfere with the rotation of the latter.

Referring now to FIG. 18, there is shown a drive system for turning the roller means 406. The drive system includes, for example, a wheel 412, toothed or otherwise, rotatably arranged at the end of the lever 402 that is pivoted to the frame portion 40. Cooperating with the wheel 412 is, for example, the aforementioned endless belt 410 having, for example, corresponding teeth (not shown) on its internal surface. The belt 410 cooperates with the roller means 406 via, for example, a second, correspondingly toothed, wheel 414 that is affixed to the roller means 406 and adapted to transmit rotation thereto. The structure illustrated in FIG. 18, for example, corresponds to the structure illustrated in FIGS. 15 and 16. On the other hand, with respect to FIG. 17, the toothed wheel 414 of FIG. 18 is replaced by the roller means 406 itself, the latter having a toothed periphery for cooperation with the toothed belt 410.

In operation of the variants illustrated in FIGS. 14 through 18, by conventional means (not shown), the toothed wheel 412 is rotated clockwise to effect rotation of the roller means 406 also clockwise. The weight of the lever 402 and roller means 406 provides for a normal force against bottles advanced thereto by, for example, the timing rollers 52 and 54. Preferably, the periphery of the roller means 406 engaging the bottles is turned more slowly than the portions of the discs 232 of the discriminating roller 62 that subsequently grip the bottles in succession. As a result, the roller means 406 retards the advancement of the upper side of each of the bottles relative to the lower side, and causes such bottles to pivot clockwise about a horizontal axis normal to the discs 232.

If a given one of the bottles has an open-end leading disposition, the bottle will be pivoted until the open end thereof engages, or nearly engages, the roller means 406. Rotation of the discriminating roller 62 counterclockwise will in turn transfer the pivoted bottle from an open-end-up disposition, such as at 420, to the disposition shown at 422, whereupon such bottle will fall into the chute 64 bottom-first. If a given bottle is gripped by the discriminating roller 62 bottom-first, the bottle will still be pivoted clockwise by the roller means 406, but only until the open end thereof engages, for example, the hub 230 of the discriminating roller 62. As such, any bottle having a closed-end leading disposition emerging from the timing rollers 52 and 54 will be transferred without a change in its disposition by the discriminating roller 62 to the chute 64, whereupon it will fall bottom-first thereinto.

It will be understood, although not shown, that springs and/or other control devices may be utilized for urging the lever 402 downwardly toward the train of bottles so as to enable the roller means 406 to frictionally retard the advancement of each bottle with a preferred pressure. It will also be understood, although not shown, that appropriate abutment means is provided to limit the downward swing of the lever 402 to a preferred distance from the discriminating roller 62.

Having thus set forth the nature of the present invention, it will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. Bottle orienting apparatus comprising guide means for receiving and advancing in random open-end leading and open-end trailing dispositions bottles having one corresponding end portion which is enlarged relative to the other end portion thereof, discriminating means downstream of and cooperative with said guide means for distinguishing bottles of enlarged-end trailing disposition from bottles of enlarged-end leading disposition and altering the disposition of each of the enlarged-end trailing bottles to respective enlarged-end leading dispositions as said bottles move through said discriminating means, said discriminating means including bottle dragging means for applying an external frictional force to the enlarged-end portions of said bottles in said discriminating means, said force tending to rotate said bottles in said discriminating means about an axis passing through said bottles, said discriminating means including means for preventing rotation therein of bottles which are received therein in an enlarged-end leading disposition, said discriminating means further including gripping means for frictionally gripping opposite sides of said bottles upon their arrival at said discriminating means, said gripping means including a pair of coaxially spaced, flexible, disc-like elements and a drive means for rotating said disc-like elements in unison in a prescribed direction, said bottle-dragging means being engageable with said bottles in succession at a location above the rotary axis of said disc-like elements and tending to rotate each of said bottles in a direction opposite to said prescribed direction in which said disc-like elements are rotated, said bottle dragging means including roller means having a periphery confronting radially the space between said disc-like elements and roller drive means for rotating said roller means at a peripheral speed that is less than the speed of rotation of the respective portions of said disc-like elements which grip said bottles in succession, said roller drive means including a drive pulley operatively associated with said roller means and an endless belt coupling said drive pulley and said roller means to one another, said guide means including a set of pulleys and a second endless belt coupling said set of pulleys to one another and arranged below and in spaced relation from said roller means and said endless belt associated with said roller means, said endless belt associated with said set of pulleys and said endless belt associated with said roller means being cooperative with one another to grip and advance said bottles in succession to said discriminating means, said bottle orienting apparatus further including take-off means positioned downstream of said discriminating means and cooperative therewith for removing from said discriminating means all of the bottles which pass therethrough.

* * * * *